United States Patent
Hwang et al.

(10) Patent No.: US 8,169,180 B2
(45) Date of Patent: May 1, 2012

(54) MOTOR CONTROLLER OF AIR CONDITIONER

(75) Inventors: Sun Ho Hwang, Changwon-si (KR); Han Su Jung, Changwon-si (KR); Chung Hun Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 596 days.

(21) Appl. No.: 12/318,059

(22) Filed: Dec. 19, 2008

(65) Prior Publication Data

US 2009/0160382 A1    Jun. 25, 2009

(30) Foreign Application Priority Data

Dec. 21, 2007  (KR) .................... 10-2007-0135488

(51) Int. Cl.
*H02P 27/00*       (2006.01)
(52) U.S. Cl. .............. 318/812; 318/400.01; 318/400.26; 318/700; 318/727; 318/767; 363/135; 363/136; 363/137; 363/138; 363/139
(58) Field of Classification Search ............ 318/400.01, 318/400.26, 700, 727, 767, 812; 363/135–139
See application file for complete search history.

(56) References Cited

U.S. PATENT DOCUMENTS

| | | | | |
|---|---|---|---|---|
| 4,928,052 A | * | 5/1990 | Fujioka et al. ............... 318/762 |
| 5,648,892 A | * | 7/1997 | Wieloch et al. .............. 361/788 |
| 5,712,551 A | * | 1/1998 | Lee ............... 318/466 |
| 6,278,622 B1 | | 8/2001 | Shimazaki et al. |
| 7,042,178 B2 | * | 5/2006 | Yamada et al. ............. 318/376 |
| 7,932,688 B2 | * | 4/2011 | Han et al. ................... 318/441 |
| 2002/0191427 A1 | | 12/2002 | Ohmura et al. |
| 2005/0099829 A1 | * | 5/2005 | Wei et al. ................... 363/34 |
| 2005/0237011 A1 | * | 10/2005 | Woods et al. .................. 318/53 |
| 2006/0087259 A1 | * | 4/2006 | Fiorello ....................... 315/291 |
| 2006/0208687 A1 | * | 9/2006 | Takeoka et al. ............. 318/801 |
| 2008/0079373 A1 | * | 4/2008 | Melfi .............................. 318/63 |
| 2009/0160378 A1 | * | 6/2009 | Hwang et al. ............ 318/400.3 |

FOREIGN PATENT DOCUMENTS

| | | |
|---|---|---|
| EP | 0 697 569 | 2/1996 |
| EP | 0 698 769 | 2/1996 |
| EP | 0 866 284 | 9/1998 |
| JP | 2005020919 A * | 1/2005 |

* cited by examiner

*Primary Examiner* — Walter Benson
*Assistant Examiner* — Kawing Chan
(74) *Attorney, Agent, or Firm* — McKenna Long & Aldridge LLP

(57) ABSTRACT

The present invention relates to a motor controller of an air conditioner, including a converter for converting a commercial AC power into a DC power, an inverter including a plurality of switching elements, the inverter receiving the DC power, converting the DC power into an AC power through a switching operation and driving a three-phase motor, a gate driver for controlling the switching operation of the switching elements, and a plurality of voltage drop units connected between the converter and the gate driver, the voltage drop units dropping the DC power and supplying driving voltages for an operation of the switching elements. Accordingly, circuit elements within a controller can be protected.

6 Claims, 11 Drawing Sheets

MOTOR CONTROLLER OF AIR CONDITIONER

BACKGROUND

1. Field of the Invention

The present invention relates to a motor controller of an air conditioner and, more particularly, to a motor controller of an air conditioner, which can protect circuit elements.

2. Discussion of the Art

An air conditioner is an apparatus which is disposed in space, such as rooms, dining rooms, office rooms, and shops, and is adapted to control the temperature, moisture, cleaning and airstream of the air in order to maintain pleasant indoor environments.

An air conditioner is generally classified into an integral type and a separation type. The integral type and the separated type are identical functionally. The integral type includes an integrated cooling and heat-dissipation function and is installed in a wall of a house or hung on the wall. The separated type includes an indoor unit for performing cooling/heating on the indoor side and an outdoor unit for performing heat dissipation and compression functions on the outdoor side, and has the two separated units connected by a refrigerant pipeline.

Meanwhile, an air conditioner employs motors for a compressor, fans, etc. and also includes a motor controller for driving the compressor, fans, etc. A motor controller of an air conditioner controls motors for a compressor, fans, etc. by receiving a commercial AC power, converting the received commercial AC power into a DC voltage, converting the DC voltage into a commercial AC power of a predetermined frequency, and supplying the converted commercial AC power to the motors.

Meanwhile, a variety of power sources are used in the motor controller of the air conditioner. In particular, an operating power source for controlling a microcomputer is used. When this operating power source is supplied by one device or this device operates abnormally, there is a high possibility that most circuit elements within a motor controller connected to the device can be damaged. Accordingly, there is a need for various schemes for protecting circuit elements.

SUMMARY

Technical Problem

An object of the present invention is to provide a motor controller of an air conditioner, which can protect circuit elements within a controller.

Technical Solution

A motor controller of an air conditioner in accordance with an embodiment of the present invention includes a converter for converting a commercial AC power into DC power, an inverter including a plurality of switching elements, the inverter receiving the DC power, converting the DC power into an AC power through a switching operation and driving a three-phase motor, a gate driver for controlling the switching operation of the switching elements, and a plurality of voltage drop units connected between the converter and the gate driver, the voltage drop units dropping the DC power and supplying driving voltages for an operation of the switching elements.

Further, a motor controller of an air conditioner in accordance with an embodiment of the present invention includes a converter for converting a commercial AC power into DC power, an inverter including a plurality of switching elements, the inverter receiving the DC power, converting the DC power into an AC power through a switching operation and driving a three-phase motor, a gate driver for controlling the switching operation of the switching elements, a rectifier unit for rectifying the commercial AC power, and a plurality of voltage drop units connected between the rectifier unit and the gate driver, the voltage drop units dropping the rectified voltage from the rectifier unit and supplying driving voltages for an operation of the switching elements.

Further, a motor controller of an air conditioner in accordance with an embodiment of the present invention includes a converter including a plurality of switching elements, the converter receiving a commercial AC power and converting the received AC power into DC power through a switching operation, an inverter for receiving the DC power, converting the received DC power into an AC power, and driving a three-phase motor, a gate driver for controlling the switching operation of the switching elements, and a plurality of voltage drop units connected between the converter and the gate driver, the voltage drop units dropping the DC power and supplying driving voltages for an operation of the switching elements.

Further, a motor controller of an air conditioner in accordance with an embodiment of the present invention includes a converter including a plurality of switching elements, the converter receiving a commercial AC power and converting the received AC power into DC power through a switching operation, an inverter for receiving the DC power, converting the received DC power into an AC power, and driving a three-phase motor, a gate driver for controlling the switching operation of the switching elements, a rectifier unit for rectifying the commercial AC power, and a plurality of voltage drop units connected between the rectifier unit and the gate driver, the voltage drop units dropping the rectified voltage from the rectifier unit and supplying driving voltages for an operation of the switching elements.

Further, a motor controller of an air conditioner in accordance with an embodiment of the present invention includes a converter for converting a commercial AC power into DC power, an inverter for a compressor including a plurality of switching elements, the inverter for the compressor receiving the DC power, converting the DC power into an AC power and driving a motor for a compressor, an inverter for a fan including a plurality of switching elements, the inverter for the fan receiving the DC power, converting the DC power into an AC power and driving a motor for a fan, a gate driver for a compressor for controlling a switching operation of the switching elements of the inverter for the compressor, a gate driver for a fan for controlling a switching operation of the switching elements of the inverter for the fan, and a plurality of voltage drop units for dropping the DC power and supplying driving voltages for an operation of the switching elements of the inverter for the compressor or the switching elements of the inverter for the fan.

Further, a motor controller of an air conditioner in accordance with an embodiment of the present invention includes a converter for converting a commercial AC power into DC power, an inverter for a compressor including a plurality of switching elements, the inverter for the compressor receiving the DC power, converting the DC power into an AC power and driving a motor for a compressor, an inverter for a fan including a plurality of switching elements, the inverter for the fan receiving the DC power, converting the DC power into an AC power and driving a motor for a fan, a gate driver for a compressor for controlling a switching operation of the switching elements of the inverter for the compressor, a rectifier unit for rectifying the commercial AC power, and a plurality of voltage drop units for dropping the rectified voltage from the rectifier unit and supplying driving voltages for an operation of the switching elements of the inverter for the compressor or the switching elements of the inverter for the fan.

Further, a motor controller of an air conditioner in accordance with an embodiment of the present invention includes a converter including a plurality of converter switching elements, the converter receiving a commercial AC power and converting the received AC power into DC power through a switching operation, an inverter including a plurality of inverter switching elements, the inverter receiving the DC power, converting the DC power into an AC power through a switching operation and driving a three-phase motor, a converter gate driver for controlling the switching operation of the converter switching elements, an inverter gate driver for controlling the switching operation of the inverter switching elements, and a plurality of voltage drop units for dropping the DC power and supplying driving voltages for the operation of the converter switching elements or the inverter switching elements.

Further, a motor controller of an air conditioner in accordance with an embodiment of the present invention includes a converter including a plurality of converter switching elements, the converter receiving a commercial AC power and converting the received AC power into DC power through a switching operation, an inverter including a plurality of inverter switching elements, the inverter receiving the DC power, converting the DC power into an AC power through a switching operation and driving a three-phase motor, a converter gate driver for controlling the switching operation of the converter switching elements, an inverter gate driver for controlling the switching operation of the inverter switching elements, a rectifier unit for rectifying the commercial AC power, and a plurality of voltage drop units for dropping the rectified voltage from the rectifier unit and supplying driving voltages for the operation of the converter switching elements or the inverter switching elements.

Advantageous Effects

A motor controller of an air conditioner in accordance with an embodiment of the present invention can protect circuit elements within a controller although failure occurs in any one voltage drop unit. Further, the motor controller of an air conditioner according to the present invention can supply a dropped power source stably since it uses a plurality of voltage drop units.

DETAILED DESCRIPTION OF THE EMBODIMENTS

The present invention is now described in detail in connection with embodiments with reference to the accompanying drawings.

Figure 1:
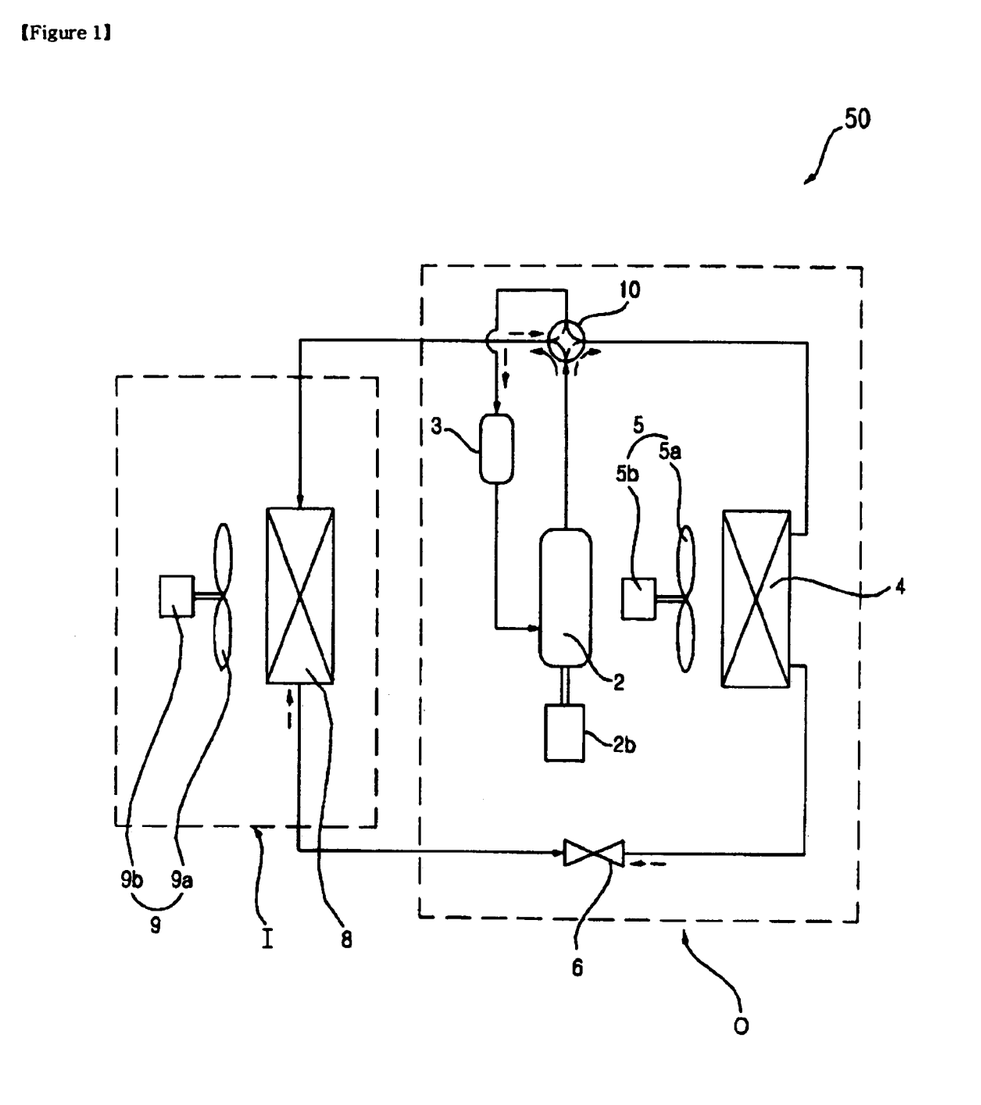
FIG. 1 is a schematic view of an air conditioner related to the present invention.

FIG. 1 is a schematic view of an air conditioner related to the present invention.

Referring to the drawing, an air conditioner 50 is largely divided into the indoor unit I and an outdoor unit O.

The outdoor unit O includes a compressor 2 functioning to compress refrigerant, a motor 2b for the compressor for driving the compressor, an outdoor-side heat exchanger 4 functioning to dissipate heat of compressed refrigerant, an outdoor ventilation fan 5, including an outdoor fan 5a disposed on one side of the outdoor heat exchanger 5 and configured to accelerate heat dissipation of refrigerant and a motor 5b for rotating the outdoor fan 5a, an expansion mechanism 6 for expanding condensed refrigerant, a cooling/heating switching valve 10 for switching the flow passage of compressed refrigerant, an accumulator 3 for temporarily storing vaporized refrigerant, removing moisture and alien substance from the refrigerant and supplying refrigerant of a specific pressure to the compressor, and so on.

The indoor unit 1 includes an indoor-side heat exchanger 8 disposed indoor and performing a cooling/heating function, an indoor ventilation fan 9 disposed on one side of the indoor-side heat exchanger 8 and including an indoor fan 9a for accelerating heat dissipation of refrigerant and a motor 9b for rotating the indoor fan 9a, and so on.

At least one indoor-side heat exchanger 8 can be installed. The compressor 2 can employ at least one of an inverter compressor and a constant speed compressor.

Further, the air conditioner 50 can be constructed as a cooling device for cooling the indoor or a heat pump for cooling or heating the indoor.

Meanwhile, the motor in the motor controller of the air conditioner in accordance with an embodiment of the present invention can be each of motor 2b, 5b, and 9b for operating the compressor, the outdoor fan, and the indoor fan.

Figure 2:
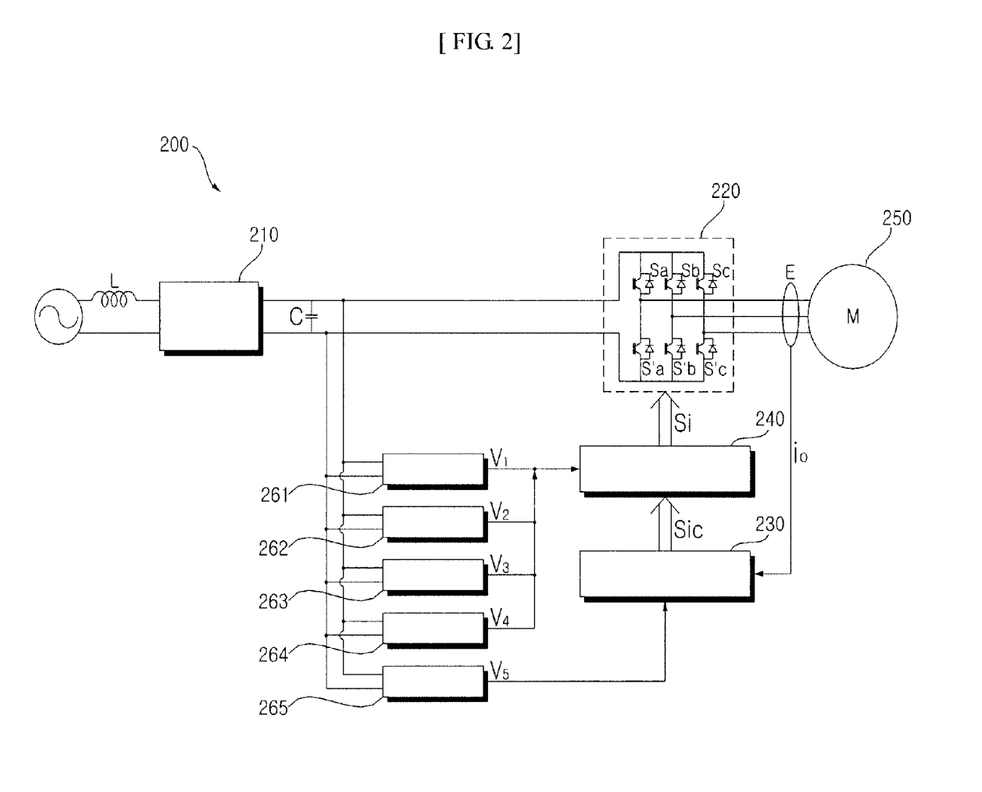
FIG. 2 is a circuit diagram showing a motor controller of an air conditioner in accordance with an embodiment of the present invention.

FIG. 2 is a circuit diagram showing a motor controller of an air conditioner in accordance with an embodiment of the present invention.

Referring to the drawing, a motor controller 200 of an air conditioner in accordance with an embodiment of the present invention includes a converter 210, an inverter 220, a gate driver 240, and a plurality of voltage drop units 261 to 265. Further, the motor controller 200 of an air conditioner of FIG. 2 can further include a microcomputer 230. Further, the motor controller 200 of an air conditioner of FIG. 2 can further include a reactor L, a smoothing capacitor C, an output current detection means E, and so on.

The reactor L is disposed between a commercial AC power and the converter 210 and performs a power factor correction or boosting operation. Further, the reactor L can also function to limit the harmonic current by high-speed switching of the converter 210.

The converter 210 converts the commercial AC power, passing through the reactor L, into DC power and outputs the converted power source. Although in the drawing the commercial AC power has been illustrated as a single-phase AC power, the commercial AC power may be a three-phase AC power. An internal structure of the converter 210 can be changed depending on the type of the commercial AC power. For example, in the case of the single-phase AC power, a half-bridge type converter in which two switching elements and four diodes are connected can be used. In the case of the three-phase AC power, six switching elements and six diodes can be used.

The converter 210 includes a plurality of switching elements and performs a boosting operation, power factor improvement and DC power conversion through a switching operation.

The smoothing capacitor C is connected to an output terminal of the converter 210 and smoothes a converted DC power output from the converter 210. Hereinafter, the output terminal of the converter 210 is called a dc terminal or a dc link terminal. The DC voltage smoothed in the dc terminal is applied to the inverter 220.

The inverter 220 includes a plurality of inverter switching elements. The inverter 220 converts the smoothed DC power into a commercial AC power of a predetermined frequency through an on/off operation of the switching elements and outputs a converted DC power to the three-phase motor.

The inverter 220 includes a total of three pairs of upper arm switching elements and lower arm switching elements, which are connected in parallel (Sa&S'a, Sb&S'b, and Sc&S'c), wherein one pair of the upper and lower arm switching elements is connected in series. To each switching element is connected a diode in reverse parallel design.

The switching elements within the inverter 220 are turned on/off in response to a switching signal Si of the gate driver 240. Thus, the three-phase AC power having a predetermined frequency is output to a three-phase motor 250. The switching signal Si is generated based on a switching control signal Sic from the microcomputer 230.

The three-phase motor 250 is provided with a stator and a rotor. An AC power of a predetermined frequency of each phase is applied to a coil of the stator of each phase, so that the rotor is rotated. The type of the motor 250 can include various forms such as a BLDC motor and a synRM motor.

Meanwhile, the microcomputer 230 controls the gate driver 240. That is, in order to control the switching operation of the inverter 220, the microcomputer 230 outputs the inverter switching control signal Sic to the gate driver 240. The switching control signal Sic is a switching control signal for PWM and is generated based on a detected output current $i_o$. A detailed operation of the microcomputer 230 is described later on with reference to FIG. 4.

The gate driver 240 receives the inverter switching control signal Sic from the microcomputer 230 and outputs the inverter switching signal Si, thus controlling the on/off operation of the switching elements within the inverter 220.

The output current detection means E detects an output current of the output terminal of the inverter 220 (that is, current flowing through the motor 250). The output current detection means E can be disposed between the inverter 220 and the motor 250 and can employ a current sensor, a CT (current transformer), a shunt resistor or the like for current detection.

Meanwhile, the output current detection means E can be a shunt resistor having one terminal connected to each of the three lower arm switching elements of the inverter 220. The detected output current io is applied to the microcomputer 230. The inverter switching control signal Sic is generated based on the detected output current $i_o$.

Meanwhile, the plurality of voltage drop units 261 to 265 is connected between the converter 210 and the gate driver 240, and they drop a dc terminal voltage Vdc, that is, an output terminal voltage of the converter and supply a dropped voltage as a driving voltage for operating the inverter switching elements. That is, the voltage drop units 261 to 265 supply a dropped voltage to the gate driver 240. The voltage drop units 261 to 265 also supply a dropped voltage to the microcomputer 230.

For example, the first voltage drop unit to the third voltage drop unit 261 to 263 can supply driving voltages V1 to V3 to the three upper arm switching elements Sa, Sb, and Sc of the switching elements of the inverter 220 through the gate driver 240, respectively.

Further, the fourth voltage drop unit 264 supplies a common driving voltage V4 to the lower arm switching elements S'a, S'b, and S'c of the switching elements of the inverter 220 through the gate driver 240.

Meanwhile, the fifth voltage drop unit 265 supplies a driving voltage V5 for an operation of the microcomputer 230.

Meanwhile, the amount of voltages dropped at the plurality of voltage drop units 261 to 265, that is, the driving voltages V1 to V5 may be approximately 5V to 15V.

As described above, since the plurality of voltage drop units is included, the degree of damage to the circuit elements connected to the voltage drop units, when the voltage drop units operate abnormally, can be reduced, so that other circuit elements can be protected. Further, dropped voltages can be generated independently and stably.

Although not shown in the drawing, the motor controller of an air conditioner of FIG. 2 can further include dc terminal voltage detection means (not shown) for detecting the dc terminal voltage in order to generate a converter switching control signal Scc, and input current detection means (not shown) for detecting an input current supplied from the commercial AC power.

Figure 3:
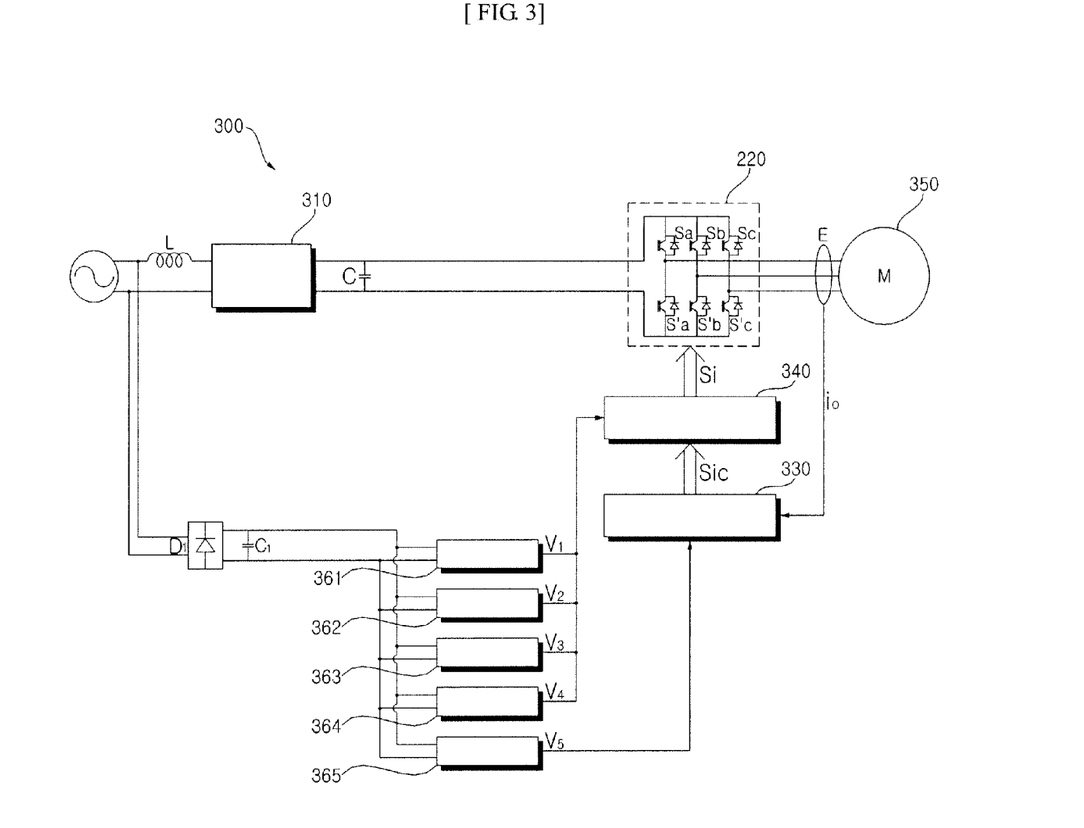
FIG. 3 is a circuit diagram showing a motor controller of an air conditioner in accordance with an embodiment of the present invention.

FIG. 3 is a circuit diagram showing a motor controller of an air conditioner in accordance with an embodiment of the present invention.

Referring to the drawing, a motor controller 300 of an air conditioner in accordance with an embodiment of the present invention includes a converter 310, an inverter 320, a gate driver 340, and a plurality of voltage drop units 361 to 365. Further, the motor controller 300 of an air conditioner of FIG. 3 can further include a microcomputer 330. Further, the motor controller 300 of an air conditioner of FIG. 3 can further include a reactor L, a smoothing capacitor C, output current detection means E, and so on.

The motor controller 300 of an air conditioner of FIG. 3 is similar to the motor controller 200 of an air conditioner of FIG. 2. In other words, the converter 310, the inverter 320, the microcomputer 330, the gate driver 340, the plurality of voltage drop units 361 to 365, the reactor L, the smoothing capacitor C, and the output current detection means E are similar to those of FIG. 2.

However, the motor controller 300 of an air conditioner of FIG. 3 further includes a rectifier unit D1 and a smoothing capacitor C1.

The rectifier unit D1 rectifies a commercial AC power. The rectifier unit D1 can include four diode elements when the commercial AC power is a single phase and can include six diode elements when the commercial AC power is a three phase.

The current voltage rectified in the rectifier unit D1 is smoothed in the smoothing capacitor C1.

The plurality of voltage drop units 361 to 365 of FIG. 3 employs the voltage, rectified in the rectifier unit D1 and then smoothed.

That is, the plurality of voltage drop units 361 to 365 is connected between the rectifier unit D1 and the gate driver 340, and they drop the rectified and smoothed voltage and supply a dropped voltage as a driving voltage for an operation of the inverter switching elements. That is, the dropped voltage is also supplied to the gate driver 340. Further, the dropped voltage is also supplied to the microcomputer 330.

For example, the first voltage drop unit to the third voltage drop unit 361 to 363 can supply driving voltages V1 to V3 to the three upper arm switching elements Sa, Sb, and Sc of the switching elements of the inverter 320 through the gate driver 340, respectively.

Further, the fourth voltage drop unit 364 supplies a common driving voltage V4 to the lower arm switching elements S'a, S'b, and S'c of the switching elements of the inverter 320 through the gate driver 340.

Meanwhile, the fifth voltage drop unit 365 supplies a driving voltage V5 for an operation of the microcomputer 330.

Meanwhile, the amount of voltages dropped at the plurality of voltage drop units 361 to 365, that is, the driving voltages V1 to V5 may be approximately 5V to 15V.

As described above, since the plurality of voltage drop units is included, the degree of damage to the circuit elements connected to the voltage drop units, when the voltage drop units operate abnormally, can be reduced, so that other circuit elements can be protected. Further, dropped voltages can be generated independently and stably.

Figure 4:
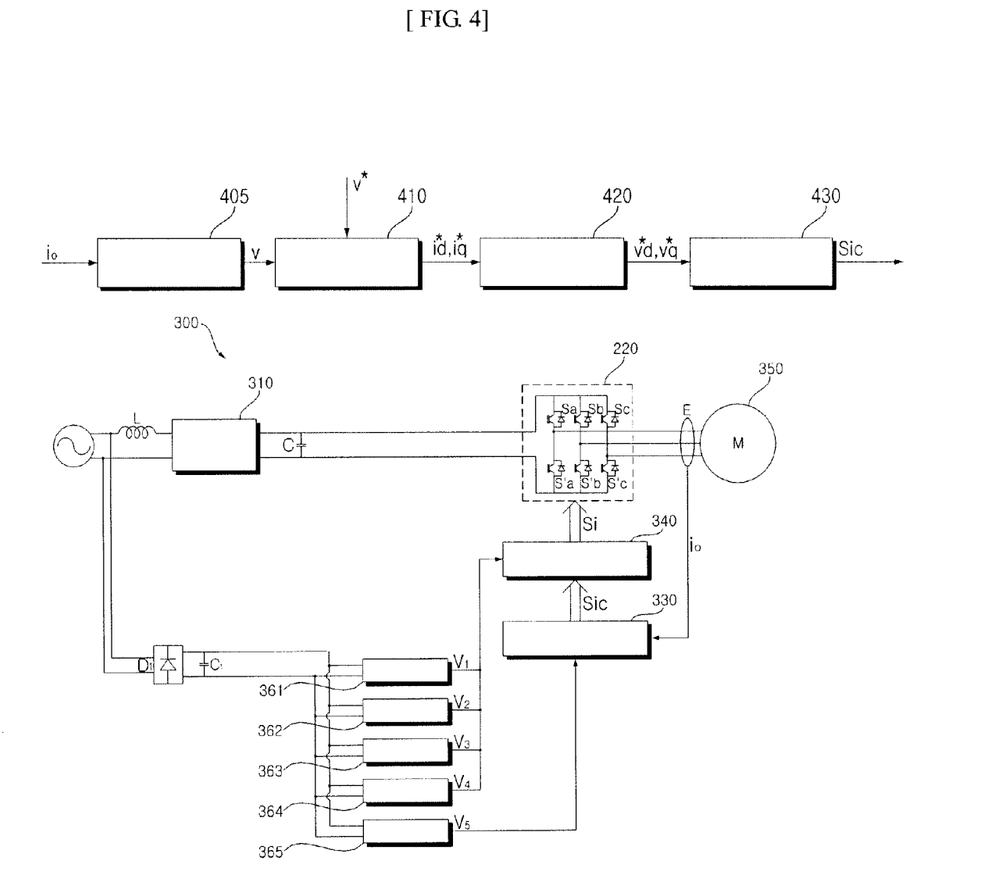
FIG. 4 is an internal block diagram of a microcomputer of FIG. 2 or 3.

FIG. 4 is an internal block diagram of the microcomputer of FIG. 2 or 3.

Referring to the drawings, the microcomputer 230 or 330 includes an estimation unit 405, a current command generator 410, a voltage command generator 420, and a switching control signal output unit 430.

The estimation unit 405 estimates a position and speed V of the rotor of the motor based on the output current io detected by the output current detection means E.

The current command generator 410 generates d,q-axis current command values (i*d,i*q) through a PI controller, etc. based on the estimated speed V and a speed command value (v*).

The voltage command generator 420 generates d,q-axis voltage command values (v*d,v*q) through a PI controller, etc. based on the d,q-axis current command values (i*d,i*q) and the detected output current io.

The switching control signal output unit 430 outputs the switching control signal Sic to the gate drivers 240 and 340 so that the inverter switching elements are driven based on the d,q-axis voltage command values (v*d,v*q).

Figure 5:
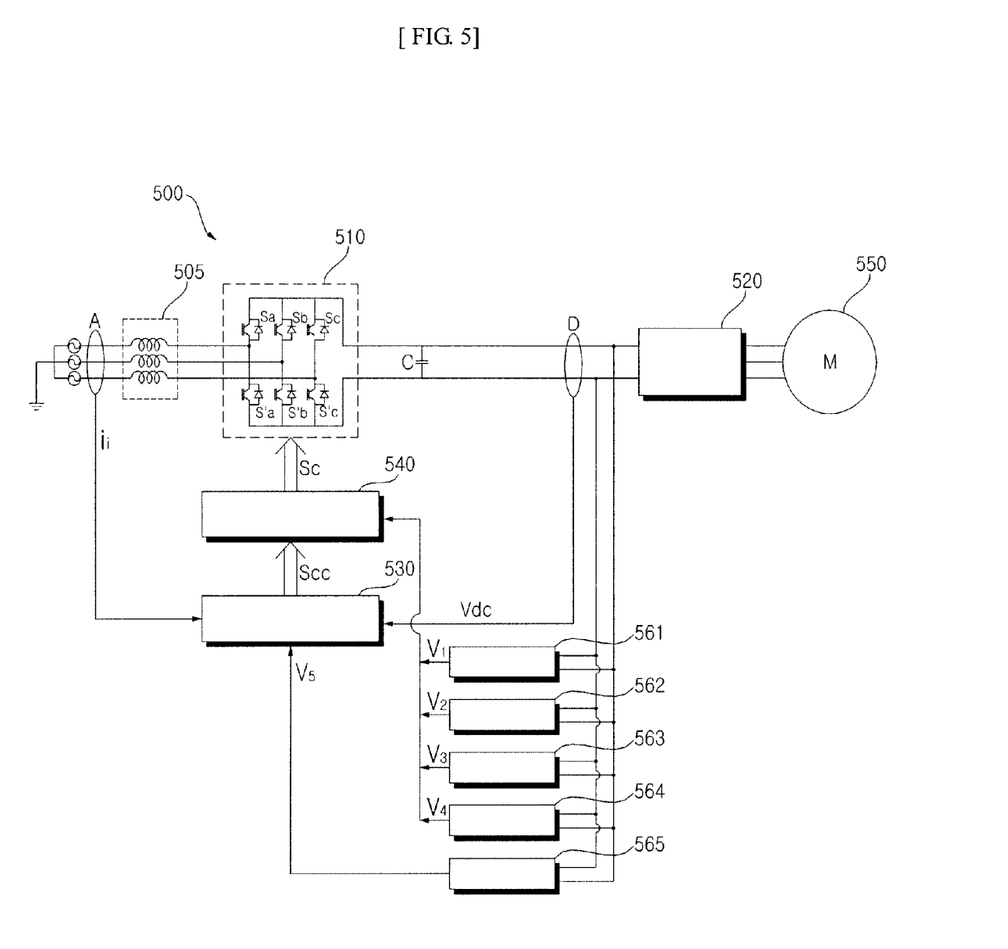
FIG. 5 is a circuit diagram showing a motor controller of an air conditioner in accordance with an embodiment of the present invention.

FIG. 5 is a circuit diagram showing a motor controller of an air conditioner in accordance with an embodiment of the present invention.

Referring to the drawing, a motor controller 500 of an air conditioner in accordance with an embodiment of the present invention includes a converter 510, an inverter 520, a gate driver 540, and a plurality of voltage drop units 561 to 565. Further, the motor controller 500 of an air conditioner can further include a microcomputer 530. Further, the motor controller 500 of an air conditioner can further include a reactor 505, a smoothing capacitor C, input current detection means A, dc terminal voltage detection means D, and so on.

The motor controller 500 of an air conditioner is similar to that the motor controller 200 of an air conditioner of FIG. 2.

However, the motor controller 500 of an air conditioner enables the microcomputer 530, the gate driver 540, and the plurality of voltage drop units 561 to 565 to control the converter 510. Further, the input current detection means A and the dc terminal voltage detection means D are used.

Hereinafter, a difference between the motor controller 500 and the motor controller 200 is mainly described.

The converter 510 includes a total of three pairs of upper arm switching elements and lower arm switching elements, which are connected in parallel (Sa&S'a, Sb&S'b, and Sc&S'c), wherein one pair of the upper and lower arm switching elements is connected in series. To each switching element is connected a diode in reverse parallel design.

The switching elements within the converter 510 are turned on/off in response to a switching signal Sc of the gate driver 540. Thus, a commercial AC power is converted into DC power. The switching signal Sc is generated based on a switching control signal Scc from the microcomputer 530.

The gate driver 540 receives the converter switching control signal Scc from the microcomputer 530 and outputs the converter switching signal Sc. The gate driver 540 controls an on/off operation of the switching elements within the converter 510 using the converter switching signal Sc.

The input current detection means A detects an input current ii input from the commercial AC power. To this end, the input current detection means A can employ a current sensor, a CT (current transformer), a shunt resistor or the like. The detected input current ii is input to the microcomputer 530 in order to generate the converter switching control signal Scc.

The dc terminal voltage detection means D detects a dc terminal voltage Vdc across the smoothing capacitor C. To this end, the dc terminal voltage detection means D includes a resistor element, and so on. The detected dc terminal voltage Vdc is input to the microcomputer 530 in order to generate the converter switching control signal Scc.

Meanwhile, the plurality of voltage drop units 561 to 565 is connected between the converter 510 and the gate driver 540, and they drop the dc terminal voltage Vdc, that is, an output terminal voltage of the converter 510 and supply a dropped voltage as a driving voltage for an operation of the converter switching elements. That is, the voltage drop units also supply the dropped voltage to the gate driver 540. Further, the voltage drop units also supply the dropped voltage to the microcomputer 530.

For example, the first voltage drop unit to the third voltage drop units 561 to 563 supply driving voltages V1 to V3 to the three upper arm switching elements Sa, Sb, and Sc, respectively, of the switching elements of the converter 510 through the gate driver 540.

Further, the fourth voltage drop unit 564 supplies a common driving voltage V4 to the lower arm switching elements S a, S b, and S c of the switching elements of the converter 510 through the gate driver 540.

Meanwhile, the fifth voltage drop unit 565 supplies a driving voltage V5 for an operation of the microcomputer 530.

Meanwhile, the amount of the voltages dropped at the plurality of voltage drop units 561 to 565, that is, the driving voltages V1 to V5 may be approximately 5V to 15V.

As described above, since the plurality of voltage drop units is included, the degree of damage to the circuit elements connected to the voltage drop units, when the voltage drop units operate abnormally, can be reduced, so that other circuit elements can be protected. Further, dropped voltages can be generated independently and stably.

Meanwhile, although not shown in the drawing, the motor controller 500 of an air conditioner 500 of FIG. 5 can further include output current detection means in order to generate an inverter switching control signal.

Figure 6:
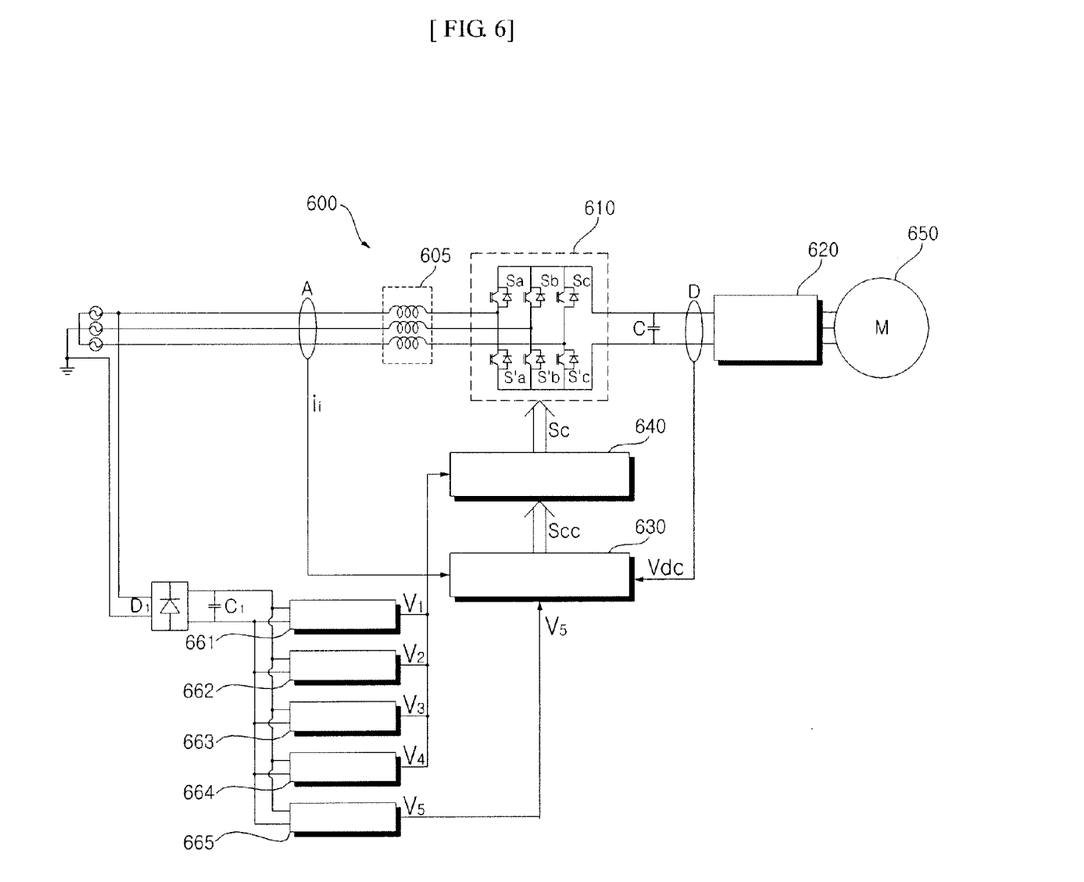
FIG. 6 is a circuit diagram showing a motor controller of an air conditioner in accordance with an embodiment of the present invention.

FIG. 6 is a circuit diagram showing a motor controller of an air conditioner in accordance with an embodiment of the present invention.

Referring to the drawing, a motor controller 600 of an air conditioner in accordance with an embodiment of the present invention includes a converter 610, an inverter 620, a gate driver 640, and a plurality of voltage drop units 661 to 665. Further, the motor controller 600 of an air conditioner of FIG. 6 can further include a microcomputer 630. Further, the motor controller 600 of an air conditioner of FIG. 6 can further include a reactor 605, a smoothing capacitor C, input current detection means A, dc terminal voltage detection means D, and so on.

The motor controller 600 of an air conditioner of FIG. 6 is similar to the motor controller 500 of an air conditioner 500 of FIG. 5. That is, the converter 610, the inverter 620, the microcomputer 630, the gate driver 640, the plurality of voltage drop units 661 to 665, the reactor 605, the smoothing capacitor C, the input current detection means A, and the dc terminal voltage detection means D are identical to those of FIG. 5.

However, the motor controller 600 of an air conditioner of FIG. 6 further includes a rectifier unit D1 and a smoothing capacitor C1.

The rectifier unit D1 rectifies a commercial AC power. The rectifier unit D1 can include four diode elements when the commercial AC power is a single phase and can include six diode elements when the commercial AC power is a three phase.

The voltage rectified in the rectifier unit D1 is smoothed in the smoothing capacitor C1.

The plurality of voltage drop units 661 to 665 of FIG. 6 employs the voltage, rectified in the rectifier unit D1 and then smoothed.

That is, the plurality of voltage drop units 661 to 665 is connected between the rectifier unit D1 and the gate driver 640, and they drop the rectified and smoothed voltage and supply a dropped voltage as a driving voltage for an operation of the inverter switching elements. That is, the dropped voltage is also supplied to the gate driver 640. Further, the dropped voltage is also supplied to the microcomputer 630.

For example, the first voltage drop unit to the third voltage drop unit 661 to 663 can supply driving voltages V1 to V3 to the three upper arm switching elements Sa, Sb, and Sc of the switching elements of the converter 610 through the gate driver 640, respectively.

Further, the fourth voltage drop unit 664 supplies a common driving voltage V4 to the lower arm switching elements S'a, S'b, and S'c of the switching elements of the converter 610 through the gate driver 640.

Meanwhile, the fifth voltage drop unit 665 supplies a driving voltage V5 for an operation of the microcomputer 630.

Meanwhile, the amount of the voltages dropped at the plurality of voltage drop units 661 to 665, that is, the driving voltages V1 to V5 may be approximately 5V to 15V.

As described above, since the plurality of voltage drop units is included, the degree of damage to the circuit elements connected to the voltage drop units, when the voltage drop units operate abnormally, can be reduced, so that other circuit elements can be protected. Further, dropped voltages can be generated independently and stably.

Figure 7:
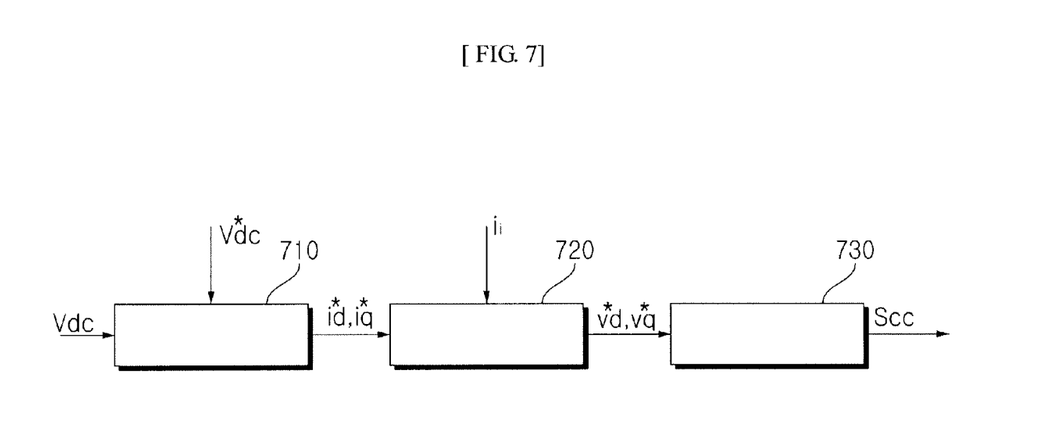
FIG. 7 is an internal block diagram of a microcomputer of FIG. 5 or 6.

FIG. 7 is an internal block diagram of the microcomputer of FIG. 5 or 6.

Referring to the drawing, the microcomputer 530 or 630 includes a current command generator 710, a voltage command generator 720, and a switching control signal output unit 730.

The current command generator 710 generates d,q-axis current command values (i*d, i*q) through a PI controller, etc. based on a detected dc terminal voltage Vdc and a dc terminal voltage command value (V*dc).

The voltage command generator 720 generates d,q-axis voltage command values (v*d, v*q) through a PI controller, etc. based on the d,q-axis current command values (i*d, i*q) and a detected output current ii.

The switching control signal output unit 730 outputs a switching control signal Scc to the gate drivers 540 and 640 so that the converter switching elements are driven based on the d,q-axis voltage command values (v*d, v*q).

Figure 8:
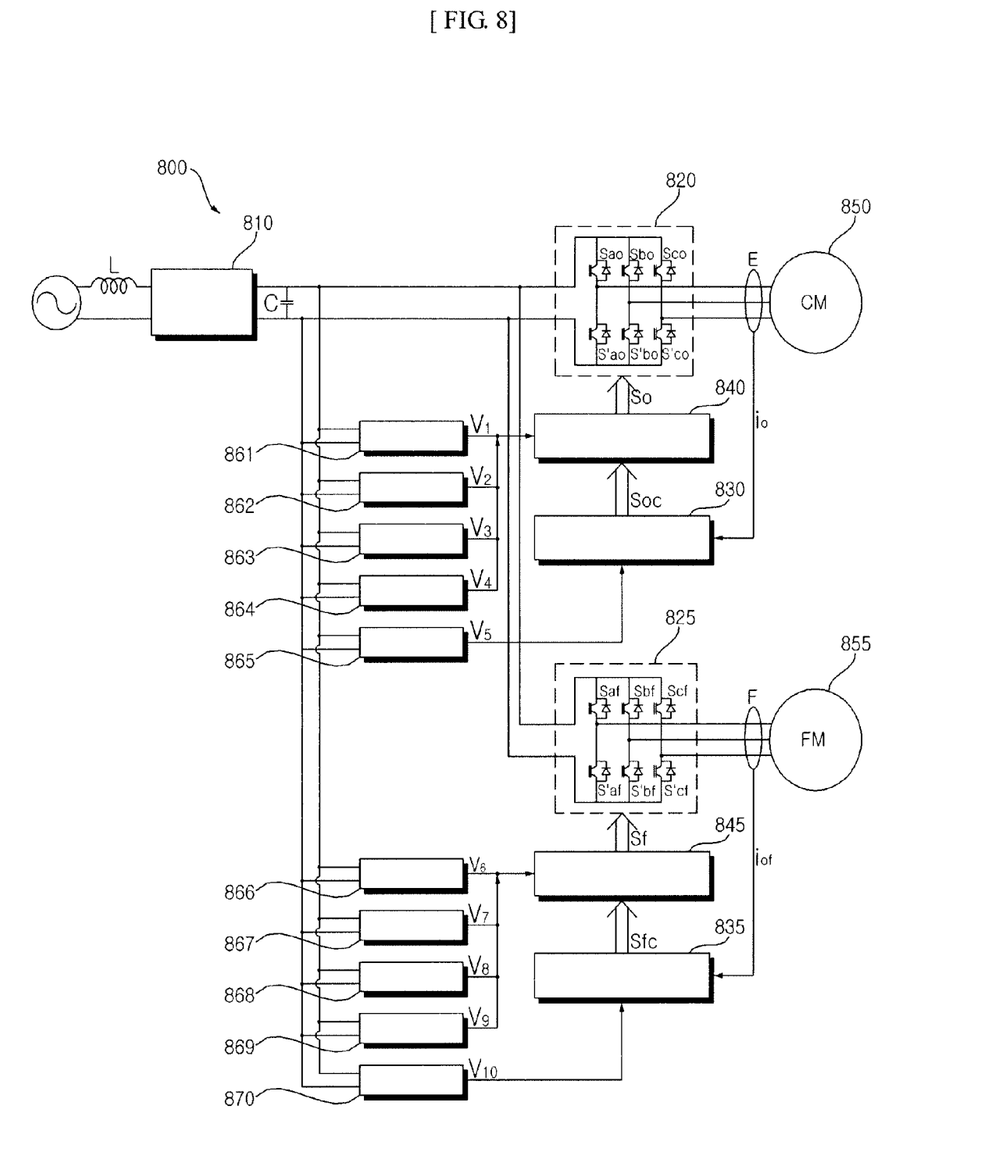
FIG. 8 is a circuit diagram showing a motor controller of an air conditioner in accordance with an embodiment of the present invention.

FIG. 8 is a circuit diagram showing a motor controller of an air conditioner in accordance with an embodiment of the present invention.

Referring to the drawing, a motor controller 800 of an air conditioner in accordance with an embodiment of the present invention includes a converter 810, an inverter for a compressor 820, an inverter for the fan 825, a gate driver for the compressor 840, a gate driver for the fan 845, and a plurality of voltage drop units 861 to 870. Further, the motor controller 800 of an air conditioner of FIG. 8 can further include a microcomputer for the compressor 830 and a microcomputer for the fan 835. Further, the motor controller 800 of an air conditioner of FIG. 8 can further include a reactor L, a smoothing capacitor C, output current detection means E, F, and so on.

The motor controller 800 of an air conditioner of FIG. 8 is similar to the motor controller 200 of an air conditioner of FIG. 2. Hereinafter, a difference between the motor controller 800 and the motor controller 200 is mainly described.

The inverter for compressor 820 includes a plurality of inverter switching elements Sao, S'ao, Sbo, S'bo, Sco, and S'co, and it converts a smoothed DC power into a commercial AC power of a predetermined frequency through an on/off operation of the switching elements and outputs a converted AC power to a motor for the compressor 850.

The inverter for compressor 820 includes a total of three pairs of upper arm switching elements and lower arm switching elements, which are connected in parallel (Sao&S'ao, Sbo&S'bo, and Sco&S'co), wherein one pair of the upper and lower arm switching elements is connected in series. To each switching element is connected a diode in reverse parallel design.

The inverter for the fan 825 includes a plurality of inverter switching elements Saf, S'af, Sbf, S'bf, Scf, and S'cf. The inverter for the fan 825 converts DC power, smoothed by an on/off operation of the switching elements, into a commercial AC power of a predetermined frequency and outputs a converted AC power to a motor for the fan 855.

The inverter for the fan 825 includes a total of three pairs of upper arm switching elements and lower arm switching elements, which are connected in parallel (Saf&S'af, Sbf&S'bf, and Scf&S'cf), wherein one pair of the upper and lower arm switching elements is connected in series. To each switching element is connected a diode in reverse parallel design.

The microcomputer for the compressor 830 controls the gate driver for the compressor 840. That is, in order to control a switching operation of the inverter for compressor 820, the microcomputer for the compressor 830 outputs an inverter switching control signal Soc to the gate driver for the compressor 840. The switching control signal Soc is a switching control signal for PWM, and is generated based on an output current io detected in the output current detection means E.

The microcomputer for the fan 835 controls the gate driver for the fan 845. That is, in order to control a switching operation of the inverter for the fan 825, the microcomputer for the fan 835 outputs an inverter switching control signal Sfc to the gate driver for the fan 845. The switching control signal Sfc is a switching control signal for PWM, and it is generated based on an output current io1 detected in the output current detection means F and then output.

Detailed operations of the microcomputer for the compressor 830 and the microcomputer for the fan 835 are identical to that of FIG. 4.

The gate driver for the compressor 840 receives the inverter switching control signal Soc from the microcomputer for the compressor 830 and outputs an inverter switching signal So. The gate driver for the compressor 840 controls an on/off operation of the switching elements within the inverter for compressor 820 using the inverter switching signal So.

The gate driver for the fan 845 receives the inverter switching control signal Sfc from the microcomputer for the fan 835 and outputs an inverter switching signal Sf. The gate driver for the fan 845 controls an on/off operation of the switching elements within the inverter for the fan 825 using the inverter switching signal Sf.

The output current detection means E detects the output current io of an output terminal of the inverter for compressor 820, that is, current flowing through the motor for the compressor 850. Further, the output current detection means F detects the output current io1 of an output terminal of the inverter for the fan 825, that is, current flowing through the motor for the fan 855.

The plurality of voltage drop units 861 to 870 drops the dc terminal voltage Vdc, that is, an output terminal voltage of the converter and outputs a dropped voltage as a driving voltage for an operation of the switching elements within the inverter for compressor 820 or the inverter for the fan 825. That is, the voltage drop units 861 to 870 supply the dropped voltage to the gate driver for the compressor 840 or the gate driver for the fan 845. Further, the voltage drop units 861 to 870 also supply the dropped voltage to the microcomputer for the compressor 830 or the microcomputer for the fan 835.

For example, the first voltage drop unit to the third voltage drop units 861 to 863 supply driving voltages V1 to V3 to upper arm switching elements Sao, Sbo, and Sco, respectively, of the switching elements of the inverter for compressor 820 through the gate driver for the compressor 840.

Further, the fourth voltage drop unit 864 supplies a common driving voltage V4 to lower arm switching elements S'ao, S'bo, and S'co of the switching elements of the inverter for compressor 820 through the gate driver for the compressor 840.

Meanwhile, the fifth voltage drop unit 865 supplies a driving voltage V5 for an operation of the microcomputer for the compressor 830.

Meanwhile, the sixth voltage drop unit to the eighth voltage drop units 866 to 868 supply driving voltages V6 to V8 to three upper arm switching elements Saf, Sbf, and Scf, respectively, of the switching elements of the inverter for the fan 825 through the gate driver for the fan 845.

Further, the ninth voltage drop unit 869 supplies a common driving voltage V9 to lower arm switching elements S'af, S'bf, and S'cf of the switching elements of the inverter for the fan 825 through the gate driver for the fan 845.

Meanwhile, the tenth voltage drop unit 870 supplies a driving voltage V10 for an operation of the microcomputer for the fan 835.

Meanwhile, the amount of the voltages dropped at the plurality of voltage drop units 861 to 870, that is, the driving voltages V1 to V10 may be approximately 5V to 15V.

As described above, since the plurality of voltage drop units is included, the degree of damage to the circuit elements connected to the voltage drop units, when the voltage drop units operate abnormally, can be reduced, so that other circuit elements can be protected. Further, dropped voltages can be generated independently and stably.

Figure 9:
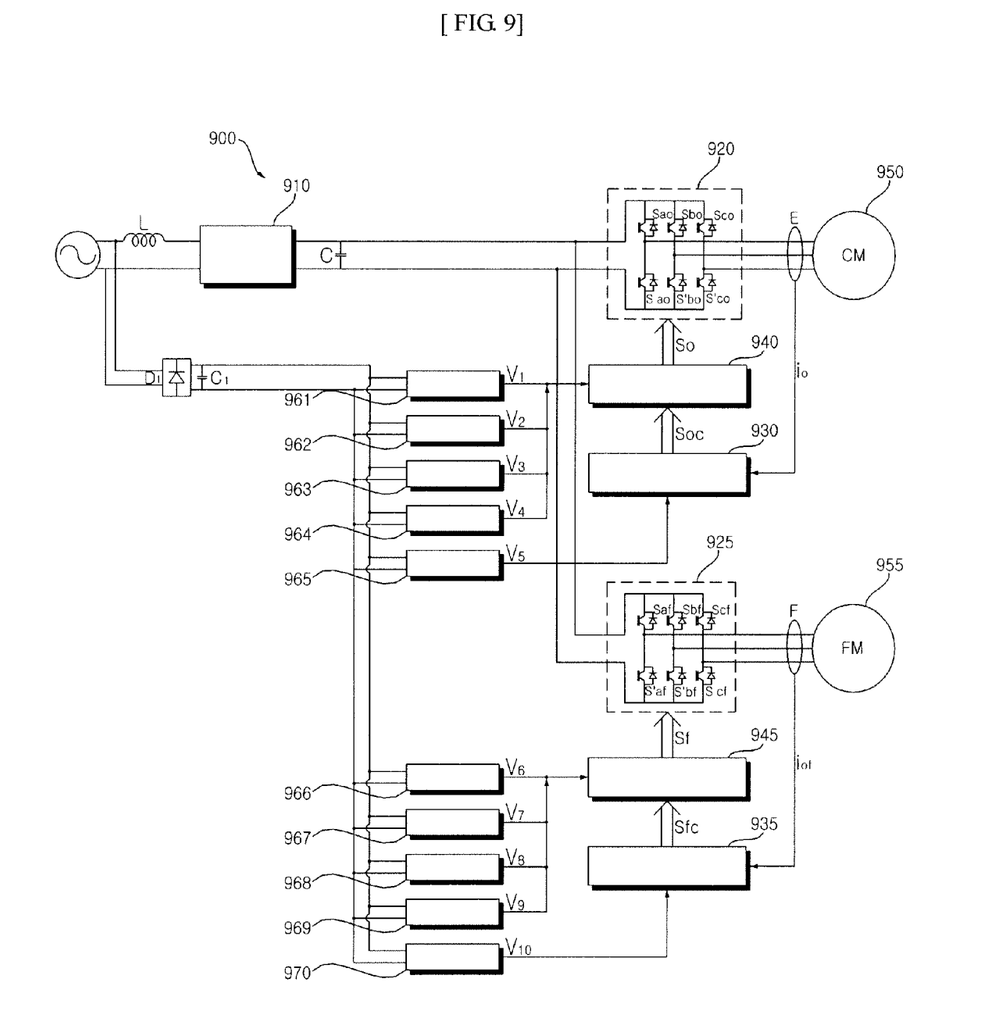
FIG. 9 is a circuit diagram showing a motor controller of an air conditioner in accordance with an embodiment of the present invention.

FIG. 9 is a circuit diagram showing a motor controller of an air conditioner in accordance with an embodiment of the present invention.

A motor controller 900 of an air conditioner of FIG. 9 is similar to the motor controller 800 of an air conditioner of FIG. 8. That is, a converter 910, an inverter for the compressor 920, an inverter for the fan 925, a microcomputer for the compressor 930 and a microcomputer for the fan 935, a gate driver for the compressor 940, a gate driver for the fan 945, a plurality of voltage drop units 961 to 970, a reactor L, a smoothing capacitor C, and output current detection means E, F are identical to those of FIG. 8.

However, the motor controller 900 of an air conditioner of FIG. 9 further includes a rectifier unit D1 and a smoothing capacitor C1.

The rectifier unit D1 rectifies a commercial AC power. The rectifier unit D1 can include four diode elements when the commercial AC power is a single phase and can include six diode elements when the commercial AC power is a three phase.

The voltage rectified in the rectifier unit D1 is smoothed in the smoothing capacitor C1.

The motor controller 900 of an air conditioner of FIG. 9 employs the voltage rectified in the rectifier unit D1 and then smoothed.

That is, the plurality of voltage drop units 961 to 970 drops the rectified and smoothed voltage and supplies the dropped voltage as a driving voltage for an operation of switching elements within the inverter for compressor 920 or the inverter for the fan 925. That is, the voltage drop units 961 to 970 supply the dropped voltage to the gate driver for the compressor 940 or the gate driver for the fan 945. Further, the plurality of voltage drop units 961 to 970 also supply the dropped voltage to the microcomputer for the compressor 930 or the microcomputer for the fan 935.

For example, the first voltage drop unit to the third voltage drop units 961 to 963 supply driving voltages V1 to V3 to three upper arm switching elements Sao, Sbo, and Sco, respectively, of the switching elements of the inverter for compressor 920 through the gate driver for the compressor 940.

Further, the fourth voltage drop unit 964 supplies a common driving voltage V4 to lower arm switching elements S'ao, S'bo, and S'co of the switching elements of the inverter for compressor 920 through the gate driver for the compressor 940.

Meanwhile, the fifth voltage drop unit 965 supplies a driving voltage V5 for an operation of the microcomputer for the compressor 930.

Meanwhile, the sixth voltage drop unit to the eighth voltage drop units 966 to 968 supply driving voltages V6 to V8 to three upper arm switching elements Saf, Sbf, and Scf, respectively, of the switching elements of the inverter for the fan 925 through the gate driver for the fan 945.

Further, the ninth voltage drop unit 969 supplies a common driving voltage V9 to lower arm switching elements S'af, S'bf, and S'cf of the switching elements of the inverter for the fan 925 through the gate driver for the fan 945.

Meanwhile, the tenth voltage drop unit 970 supplies a driving voltage V10 for an operation of the microcomputer for the fan 935.

Meanwhile, the amount of the voltages dropped at the plurality of voltage drop units 961 to 970, that is, the driving voltages V1 to V10 may be approximately 5V to 15V.

As described above, since the plurality of voltage drop units is included, the degree of damage to the circuit elements connected to the voltage drop units, when the voltage drop units operate abnormally, can be reduced, so that other circuit elements can be protected. Further, dropped voltages can be generated independently and stably.

Figure 10:
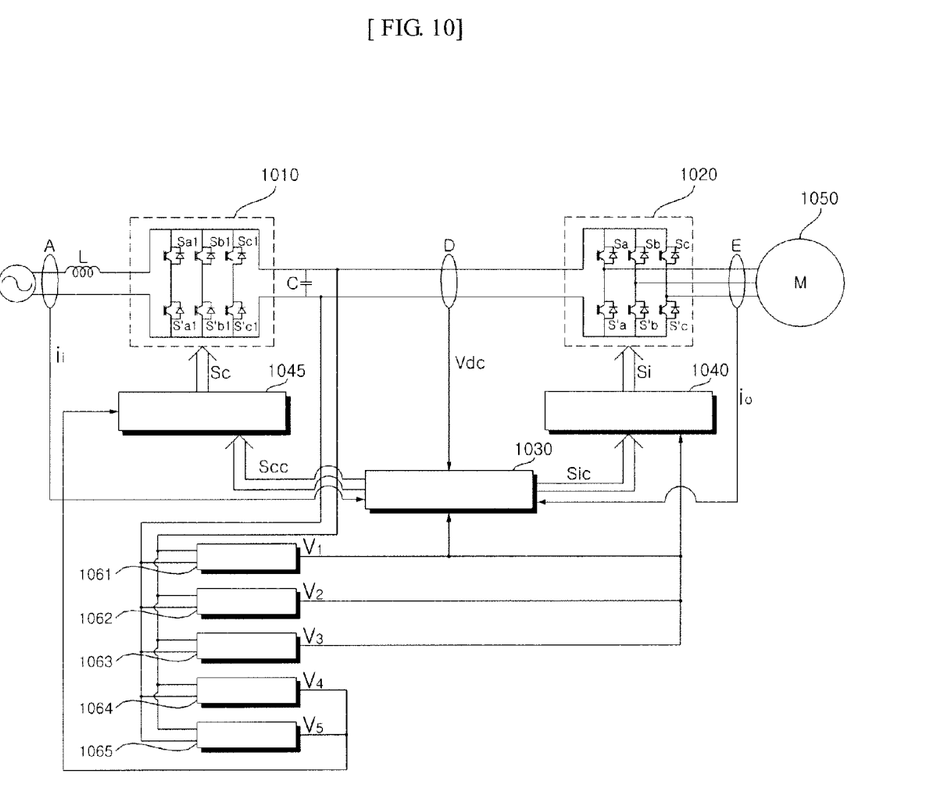
FIG. 10 is a circuit diagram showing a motor controller of an air conditioner in accordance with an embodiment of the present invention.

FIG. 10 is a circuit diagram showing a motor controller of an air conditioner in accordance with an embodiment of the present invention.

Referring to the drawing, a motor controller 1000 of an air conditioner in accordance with an embodiment of the present invention includes a converter 1010, an inverter 1020, a converter gate driver 1045, an inverter gate driver 1040, and a plurality of voltage drop units 1061 to 1065.

Further, the motor controller 1000 of an air conditioner of FIG. 10 can further include a microcomputer 1030. Further, the motor controller 1000 of an air conditioner of FIG. 10 may further include a reactor L, a smoothing capacitor C, input current detection means A, dc terminal voltage detection means D, output current detection means E, and so on.

Description on the reactor L, the smoothing capacitor C, the input current detection means A, the dc terminal voltage detection means D, and the output current detection means E is identical to that of other embodiment and therefore will be omitted.

The converter 1010 includes a plurality of converter switching elements, and it converts a commercial AC power into DC power through an on/off operation of the switching elements and outputs a converted DC power.

The converter 1010 includes a total of three pairs of upper arm switching elements and lower arm switching elements, which are connected in parallel (Sa1&S'a1, Sb1&S'b1, and Sc1&S'c1), wherein one pair of the upper and lower arm switching elements is connected in series. To each switching element is connected a diode in reverse parallel design.

The inverter 1020 includes a plurality of inverter switching elements. The inverter 1020 converts DC power, smoothed by the on/off operation of the switching elements, into a commercial AC power of a predetermined frequency and outputs the AC power to the three-phase motor.

The inverter 1020 includes a total of three pairs of upper arm switching elements and lower arm switching elements, which are connected in parallel (Sa&S'a, Sb&S'b, and Sc&S'c), wherein one pair of the upper and lower arm switching elements is connected in series. To each switching element is connected a diode in reverse parallel design.

The microcomputer 1030 controls the converter gate driver 1045 and the inverter gate driver 1040 together. That is, the microcomputer 1030 outputs a converter switching control signal Scc to the converter gate driver 1045 in order to control the switching operation of the converter 1010, and outputs an inverter switching control signal Sic to the inverter gate driver 1040 in order to control the switching operation of the inverter 1020.

The converter switching control signal Scc is a switching control signal for PWM, and it is generated based on a detected input current ii and a dc terminal voltage Vdc and then output. Reference can be made to FIG. 7 with respect to an operation of the microcomputer 1030 pertinent to the converter switching control signal Scc.

The inverter switching control signal Sic is a switching control signal for PWM, and it is generated based on a detected output current io and then output. Reference can be made to FIG. 7 with respect to an operation of the microcomputer 1030 pertinent to the inverter switching control signal Sic.

The converter gate driver 1045 receives the converter switching control signal Scc from the microcomputer 1030 and outputs a converter switching signal Sc. The converter gate driver 1045 controls the on/off operation of the switching elements within the converter 1010 using the converter switching signal Sc.

The inverter gate driver 1040 receives the inverter switching control signal Sic from the microcomputer 1030 and outputs an inverter switching signal Si. The inverter gate driver 1040 controls the on/off operation of the switching elements within the inverter 1020 using the inverter switching signal Si.

Meanwhile, the plurality of voltage drop units 1061 to 1065 drops the dc terminal voltage Vdc, that is, an output terminal voltage of the converter 1010 and supplies a dropped voltage as a driving voltage for an operation of the converter switching element or the inverter switching elements. That is, the voltage drop units 1061 to 1065 supply the dropped voltage to the converter gate driver 1045 or the inverter gate driver 1040. Further, the voltage drop units 1061 to 1065 also supply the dropped voltage to the microcomputer 1030.

For example, the first voltage drop unit to the third voltage drop units 1061 to 1063 supply driving voltages V1 to V3 to the three upper arm switching elements Sa, Sb, and Sc, respectively, of the switching elements of the inverter 1020 through the inverter gate driver 1040.

Further, the fourth voltage drop unit 1064 supplies a common driving voltage V4 to two upper arm switching elements Sa1 and Sb1 of the switching elements of the converter 1010 through the converter gate driver 1045.

Further, the fifth voltage drop unit 1065 supplies a driving voltage V5 to one upper arm switching element Sc1 of the switching elements of the converter 1010 through the converter gate driver 1045.

Meanwhile, the third voltage drop unit 1063 supplies a common driving voltage V3 to the lower arm switching elements S'a, S'b, and S'c of the switching elements of the inverter 1020 through the inverter gate driver 1040.

Further, the fifth voltage drop unit 1065 supplies a common driving voltage V5 to the lower arm switching elements S'a1, S'b1, and S'c1 of the switching elements of the converter 1010 through the converter gate driver 1045.

Meanwhile, the first voltage drop unit 1061 supplies the driving voltage V1 for an operation of the microcomputer 1030.

Meanwhile, the amount of the voltages dropped at the plurality of voltage drop units 1061 to 1065, that is, the driving voltages V1 to V5 may be approximately 5V to 15V.

As described above, since the plurality of voltage drop units is included, the degree of damage to the circuit elements connected to the voltage drop units, when the voltage drop units operate abnormally, can be reduced, so that other circuit elements can be protected. Further, dropped voltages can be generated independently and stably.

Figure 11:
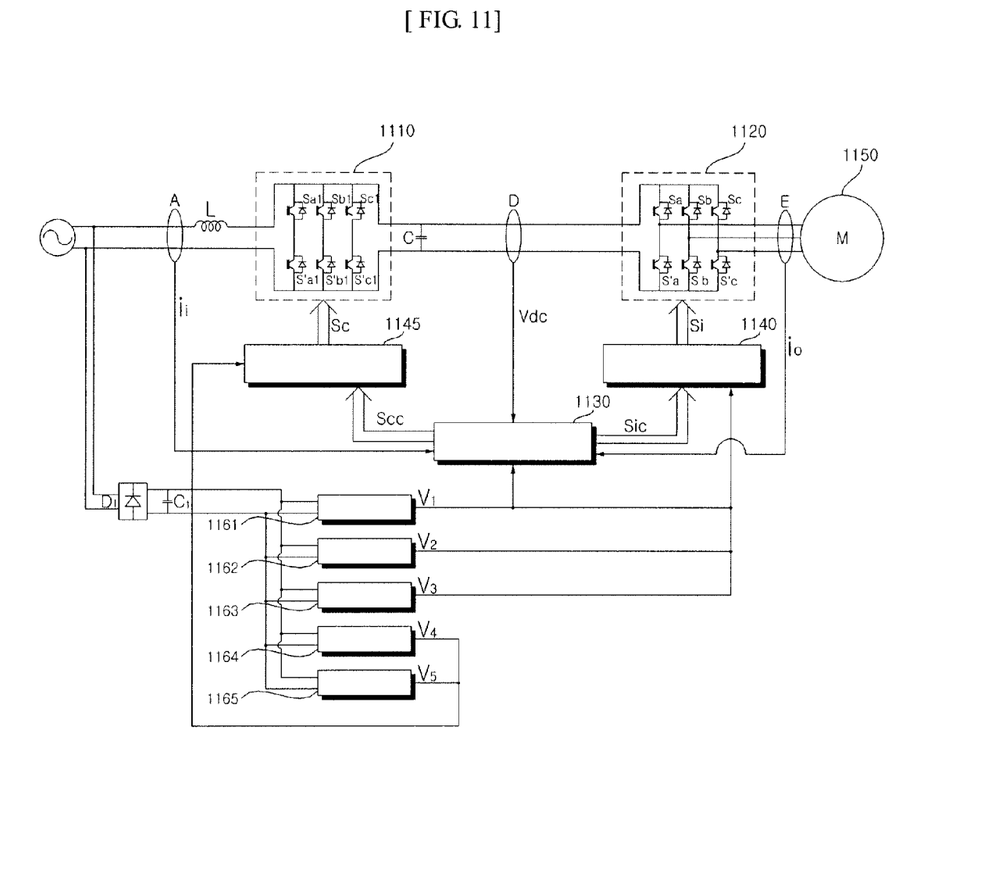
FIG. 11 is a circuit diagram showing a motor controller of an air conditioner in accordance with an embodiment of the present invention.

FIG. 11 is a circuit diagram showing a motor controller of an air conditioner in accordance with an embodiment of the present invention.

A motor controller 1100 of an air conditioner of FIG. 11 is similar to the motor controller 1000 of an air conditioner of FIG. 10.

That is, a converter 1110, an inverter 1120, a microcomputer 1130, a converter gate driver 1145, an inverter gate driver 1140, a plurality of voltage drop units 1161 to 1165, a reactor L, a smoothing capacitor C, input current detection means A, dc terminal voltage detection means D, and output current detection means E are identical to those of FIG. 10.

However, the motor controller 1100 of an air conditioner of FIG. 11 further includes a rectifier unit D1 and a smoothing capacitor C1.

The rectifier unit D1 rectifies a commercial AC power. The rectifier unit D1 can include four diode elements when the commercial AC power is a single phase and can include six diode elements when the commercial AC power is a three phase.

The voltage rectified in the rectifier unit D1 is smoothed in the smoothing capacitor C1.

The plurality of voltage drop units 1161 to 1165 of FIG. 11 employs the voltage rectified in the rectifier unit D1 and then smoothed.

That is, the plurality of voltage drop units 1161 to 1165 drops the rectified and smoothed voltage and supplies the dropped voltage as a driving voltage for an operation of switching elements within the converter 1110 or the inverter 1120.

That is, the voltage drop units 1161 to 1165 supply the dropped voltage to the converter gate driver 1145 or the inverter gate driver 1140. Further, the voltage drop units 1161 to 1165 also supply the dropped voltage to the microcomputer 1130.

For example, the first voltage drop unit to the third voltage drop units 1161 to 1163 supply driving voltages V1 to V3 to three upper arm switching elements Sa, Sb, and Sc, respectively, of the switching elements of the inverter 1120 through the inverter gate driver 1140.

Further, the fourth voltage drop unit 1164 supplies a common driving voltage V4 to two upper arm switching elements Sa1 and Sb1 of the switching elements of the converter 1110 through the converter gate driver 1145.

Further, the fifth voltage drop unit 1165 supplies a driving voltage V5 to one upper arm switching element Sc1 of the switching elements of the converter 1110 through the converter gate driver 1145.

Meanwhile, the third voltage drop unit 1163 supplies a common driving voltage V3 to lower arm switching elements S'a, S'b, and S'c of the switching elements of the inverter 1120 through the inverter gate driver 1140.

Further, the fifth voltage drop unit 1165 supplies a common driving voltage V5 to lower arm switching elements S'a1, S'b1, and S'c1 of the switching elements of the converter 1110 through the converter gate driver 1145.

Meanwhile, the first voltage drop unit 1161 supplies the driving voltage V1 for an operation of the microcomputer 1130.

Meanwhile, the amount of the voltages dropped at the plurality of voltage drop units 1161 to 1165, that is, the driving voltages V1 to V5 may be approximately 5V to 15V.

As described above, since the plurality of voltage drop units is included, the degree of damage to the circuit elements connected to the voltage drop units, when the voltage drop units operate abnormally, can be reduced, so that other circuit elements can be protected. Further, dropped voltages can be generated independently and stably.

While the invention has been described in connection with the embodiments with reference to the accompanying drawings, it will be understood that those skilled in the art can implement the technical constructions of the present invention in various forms without departing from the technical spirit or indispensable characteristics of the present invention. Therefore, the above-described embodiments should be construed to be illustrative and limitative from all aspects. Furthermore, the scope of the present invention is defined by the appended claims rather than the above detailed description. Thus, the present invention should be construed to cover all modifications or variations induced from the meaning and range of the appended claims and their equivalents.

INDUSTRIAL APPLICABILITY

The motor controller of an air conditioner in accordance with the present invention can be used to protect circuit elements using a plurality of voltage drop units.

What is claimed is:

1. A motor controller of an air conditioner, comprising:
a converter including a plurality of converter switching elements, the converter receiving AC power and converting the received AC power into DC power through a switching operation of the converter switching elements;
an inverter including a plurality of inverter switching elements, the inverter receiving the DC power, converting the DC power into AC power through a switching operation of the plurality of inverter switching elements and driving a motor;
a converter gate driver to control the switching operation of the converter switching elements;
an inverter gate driver to control the switching operation of the inverter switching elements;
a rectifier unit to rectify the AC power;
a microcomputer to control at least one of the converter gate driver or the inverter gate driver; and
a plurality of voltage drop units to drop the rectified voltage from the rectifier unit and supply the dropped voltage to at least one of the converter gate driver, the inverter gate driver, or the microcomputer,
wherein first to third voltage drop units of the voltage drop units supply the driving voltages to three inverter upper arm switching elements, respectively, and
wherein the microcomputer controls the converter gate driver and the inverter gate driver together, and
wherein the first voltage drop unit further supplies a driving voltage to the microcomputer.

2. The motor controller according to claim 1, wherein:
a fourth voltage drop unit of the voltage drop units supplies a common driving voltage to two converter upper arm switching elements, and
a fifth voltage drop unit of the voltage drop units supplies the driving voltage to one converter upper arm switching element.

3. The motor controller according to claim 2, wherein the fifth voltage drop unit further supplies a common driving voltage to the entire converter lower arm switching elements.

4. The motor controller according to claim 1, wherein the third voltage drop unit further supplies a common driving voltage to the entire inverter lower arm switching elements.

5. The motor controller of claim 1, wherein the motor is a three-phase motor.

6. The motor controller of claim 1, wherein the plurality of voltage drop units supply the dropped voltage to the converter gate driver, the inverter gate driver, and the microcomputer.

* * * * *